United States Patent
Ohyama

(10) Patent No.: US 7,567,496 B2
(45) Date of Patent: Jul. 28, 2009

(54) OPTICAL PICKUP DEVICE CAPABLE OF LOOSENING ASSEMBLY ACCURACY

(75) Inventor: Minoru Ohyama, Kanagawa-ken (JP)

(73) Assignee: Victor Company of Japan, Limited

( * ) Notice: Subject to any disclaimer, the term of this patent is extended or adjusted under 35 U.S.C. 154(b) by 218 days.

(21) Appl. No.: 11/653,365

(22) Filed: Jan. 16, 2007

(65) Prior Publication Data

US 2007/0177484 A1    Aug. 2, 2007

(30) Foreign Application Priority Data

Jan. 27, 2006    (JP)    ............ P2006-018786

(51) Int. Cl.
G11B 7/135    (2006.01)
(52) U.S. Cl. .............................. 369/112.15
(58) Field of Classification Search .............. 369/112.1, 369/112.15
See application file for complete search history.

(56) References Cited

U.S. PATENT DOCUMENTS

| | | | | |
|---|---|---|---|---|
| 5,066,138 A * | 11/1991 | Toide et al. | ............ | 369/112.1 |
| 5,638,352 A * | 6/1997 | Yang | ............ | 369/44.23 |
| 5,712,843 A * | 1/1998 | Chao et al. | ............ | 369/112.12 |
| 5,777,976 A * | 7/1998 | Dang | ............ | 369/112.04 |
| 6,072,579 A * | 6/2000 | Funato | ............ | 356/457 |
| 6,084,840 A * | 7/2000 | Jang | ............ | 369/112.12 |
| 6,130,872 A * | 10/2000 | Sugiura et al. | ............ | 369/112.04 |
| 6,185,176 B1 * | 2/2001 | Sugiura et al. | ............ | 369/112.1 |
| 7,139,235 B2 * | 11/2006 | Nakanishi et al. | ............ | 369/112.04 |
| 7,227,819 B2 * | 6/2007 | Kadowaki et al. | ............ | 369/44.41 |
| 7,345,820 B2 * | 3/2008 | Park et al. | ............ | 359/569 |
| 7,362,689 B2 * | 4/2008 | Park et al. | ............ | 369/112.01 |
| 2002/0141320 A1 * | 10/2002 | Hamaoka | ............ | 369/112.12 |
| 2005/0243685 A1 * | 11/2005 | Oouchida | ............ | 369/112.1 |
| 2006/0164952 A1 * | 7/2006 | Nakanishi et al. | ............ | 369/112.01 |
| 2007/0195664 A1 * | 8/2007 | Kadowaki et al. | ............ | 369/44.37 |

FOREIGN PATENT DOCUMENTS

| | | |
|---|---|---|
| JP | 01-220133 | 9/1989 |
| JP | 05-101417 | 4/1993 |
| JP | 10-064080 | 3/1998 |
| JP | 11-296873 | 10/1999 |
| JP | 2000-235716 | 8/2000 |
| JP | 2001-176119 | 6/2001 |

* cited by examiner

*Primary Examiner*—Peter Vincent Agustin
(74) *Attorney, Agent, or Firm*—The Nath Law Group; Jerald L. Meyer; Derek Richmond

(57) ABSTRACT

In a photo pickup device, a hologram element 13 is divided into eight areas. In operation, the hologram elements adds different lens powers to four diffraction lights forming two pairs of diffraction-light groups. In the photo pickup device, a light receiving element 19 is divided into four areas to receive these diffraction lights. The photo pickup device outputs signals corresponding to four quadrants A, B, C and D forming a reflection light from an optical disc 5, allowing a focus-error signal to be calculated in the same logic as an "astigmatism method".

2 Claims, 8 Drawing Sheets

ASTIGMATISM METHOD | INVENTION

NEAR

FE = (A+C) − (B+D) < 0

JUST

FE = (A+C) − (B+D) = 0

FAR

FE = (A+C) − (B+D) > 0

OPTICAL PICKUP DEVICE CAPABLE OF LOOSENING ASSEMBLY ACCURACY

BACKGROUND OF THE INVENTION

1. Field of the Invention

The present invention relates to an optical pickup device which carries out recording/reproducing of information signals from an information recording media, such as optical disc.

2. Description of the Related Art

There have been conventionally utilized optical discs as household information recording media, for example, so-called "CD (Compact Disc)", "DVD (Digital Versatile Disc)", and others in widespread use. Not only playback-only standard on initial use but also recordable standards (e.g. "CD-R", "CD-RW", "DVD-RAM", "DVD-R", "DVD-RW", "+R", "+RW") have recently become familiar rapidly. Additionally, "BD (Blu-ray Disc)" and "HD-DVD" are also coming into practical use, as optical discs dealing with high definition video signals.

In an optical pickup device forming a main component of a read-write apparatus (i.e. an optical disc system) performing recording/reproducing of information in relation to such an optical disc, a light receiving/emitting function is fundamental. Additionally, for both focus-servo (adjustment in focusing) and tracking-servo (adjustment in tracking) operations being physical basic actions in the read-write apparatus, optical and electrical functions to detect a focus-error signal and a tracking-error signal are essential to the optical pickup device.

In order to deal with a variety of optical discs of the above-mentioned standards, an optical pickup device is required to have some error-signal detecting functions suitable to respective optical discs of such standards. Further, it is expected to develop an optical pickup device which has not only these functions but a reasonable optical system allowing its structure to be simplified and also allowing information signals to be picked up with high accuracy. In fact, the development of an optical pickup device mentioned above is a competitive issue to various companies in this industry.

In a read-write apparatus, generally, signal outputs picked up by the optical pickup device are supplied to a FEP (Front End Processor) having integral circuits (IC) for performing both calculations and drive controls based on the signal outputs. In this view, it is desirable that an optical pickup device as one component of the read-write apparatus is capable of outputting all-purpose signals requiring neither special calculation nor development of an exclusive FEP.

As one detecting method for detecting a focus-error signal in a pickup device in related art, Japanese Patent Laid-open Publication No. H10(1998)-64080 discloses so-called "astigmatism method" (see FIGS. 1, 2 and 3 in the publication). By way of example, FIG. 1 shows one optical pickup device adopting this "astigmatism method". In this pickup device, a laser beam is radiated from a semiconductor laser 101. A collimator lens 102 changes the radiated laser beam to a parallel laser beam. Then, the so-directional laser beam is transmitted to an objective lens 104 through a polarizing beam splitter 103. The laser beam is converged by the objective lens 104 and further emitted (or projected) to an optical disc 105. Then, the laser beam forms a light spot on a recording track (pit line) on a recording surface of the optical disc 105. Meanwhile, a reflection light from the optical disc 105 is transmitted to the polarizing beam splitter 103 through the objective lens 104. Then, the reflection light is further reflected toward a detection lens 107 by the polarizing beam splitter 103. In succession, the reflection light is converged by the detection lens 107 and transmitted through a cylindrical lens 108 as an astigmatism generator. As shown in FIG. 2B, the reflection light via the cylindrical lens 108 reaches a quadrant photo detector 109 and forms a spot SP in the vicinity of a center of a light receiving surface of the detector 109. The photo detector 109 has four light receiving areas DET1, DET2, DET3 and DET4 obtained by dividing the light receiving surface into four zones by two orthogonal-oriented parting lines L1, L2. In the quadrant photo detector 109, the parting line L1 is parallel to a tangential direction in optical mapping, which is substantially identical to a tangential line of the recording track of the optical disc 105. On the other hand, the parting line L2 is parallel to a radial direction in optical mapping, which is substantial identical to a radial direction of the optical disc 105.

The cylindrical lens 108 is provided to produce an astigmatism in the reflection light from the photo disc 105. In connection with this reflection light, there are produced, at different positions on its optical axis, two focal lines which intersect with each other at right angles. When the laser beam projected onto the signal recording surface of the optical disc 105 is in an in-focus state, the spot SP on the quadrant photo detector 109 is positioned between the above-mentioned two focal lines and also shaped to be substantially circular (perfect circle), as shown in FIG. 2B.

If the focal point of the laser beam emitted to the photo disc 105 is on the front side of the signal recording surface (i.e. when a distance between the optical disc 105 and the objective lens 104 gets larger), then the spot SP to be formed on the detector 109 by the reflection light is actually formed in a position close to one of the focal lines, providing an oblong spot having a long axis in one diagonal direction of the detector 109, as shown in FIG. 2A.

If the focal point of the laser beam emitted to the photo disc 105 is on the back side of the signal recording surface (i.e. when a distance between the optical disc 105 and the objective lens 104 gets smaller), then the spot SP to be formed on the detector 109 by the reflection light is actually formed in a position close to the other one of the focal lines, providing an oblong spot having a long axis in the other diagonal direction of the detector 109, as shown in FIG. 2C.

The quadrant photo detector 109 generates four electric signals proportional to respective intensities of lights projected on the light receiving areas DET1, DET2, DET3 and DET4 and supplies a focus-error detecting circuit 110 with these signals, as shown in FIG. 1. On receipt of the signals, the focus-error detecting circuit 110 generates a focus-error signal (FES) and supplies it to an actuator driving circuit 111. Then, the actuator driving circuit 111 supplies an actuator 112 for carrying the objective lens 104 with a focusing drive signal. On receipt of the focusing drive signal, the actuator 112 operates to move the objective lens 104 in the direction of the optical axis. The focus-error detecting circuit 110 is connected to the light receiving areas DET1, DET2, DET3 and DET4 of the quadrant photo detector 109, as shown in FIG. 3. In the focus-error detecting circuit 110, light-to-photocurrent converted outputs from two light receiving areas DET1 and DET3, which are symmetric about a center O of the light receiving surface of the photo detector 109, are added to each other by a first accumulator 113, while light-to-photocurrent converted outputs from two light receiving areas DET2 and DET4 are added to each other by a second accumulator 114. Both outputs from these accumulators 113, 114 are supplied to a differential amplifier 115. The differential amplifier 115 calculates a difference between the outputs on supply and outputs the difference in the form of a focus-error signal (FES). That is, if representing respective output signals from the light receiving areas by signs "DET1", "DET2", "DET3" and "DET4", then the focus-error signal FES is obtained by the expression: FES =(DET1+DET3)−(DET2+DET4).

When the laser beam emitted to the signal recording surface of the optical disc 105 is in the in-focus state, the light intensity of the spot SP on the quadrant photo detector 109 exhibits a symmetrical intensity distribution about the center O of the light receiving surface, so that the focus-error signal becomes zero (0). While, if the laser beam emitted to the signal recording surface of the optical disc 105 is not in the in-focus state, them a sum of light-to-photocurrent converted outputs from two light receiving areas on one diagonal line of the detector 109 differs from that of light-to-photocurrent converted outputs from the other light receiving areas on the other diagonal line of the detector 109. Thus, in this case, the focus error signal outputted from the differential amplifier 115 has a value corresponding to a focus error at that time.

As another detecting method for detecting a focus-error signal in the pickup device in related art, Japanese Patent Publication Nos. 2629781 (see FIG. 8) and 2724422 (see FIG. 6) disclose so-called "SSD (spot size detection) method". In a pickup device employing this spot size method, as shown in FIG. 4, a reflection light from an optical disc is branched to two or more light fluxes R1, R2 by a not-shown hologram element or the like. Then, the light fluxes R1, R2 are further accompanied with different positive powers to be convergent lights, respectively. The light flux R1 is received by a light receiving element 201 before reaching a flux's converging point, while the other light flux R2 is received by another light receiving element 202 after passing through a flux's converging point.

In the light receiving element 201, its light receiving surface is divided into three light receiving areas DET1, DET2 and DET3 by parallel parting lines, as shown in FIG. 5. While, in the other light receiving element 202, its light receiving surface is divided into three light receiving areas DET4, DET5 and DET6 by parallel parting lines. The respective light fluxes R1, R2 form spots in the vicinity of respective centers of the light receiving surfaces.

When the laser beam emitted to the signal recording surface of the optical disc is in the in-focus state, the spots that the light fluxes R1, R2 branched from the reflection light form on the light receiving elements 201, 202 have sizes substantially equal to each other, as shown in FIG. 5.

If the focal point of the laser beam emitted to the optical disc 105 is on the back side of the signal recording surface (i.e. when a distance between the optical disc 105 and the objective lens 104 gets smaller), then the spots that the light fluxes R1, R2 branched from the reflection light form on the light receiving elements 201, 202 are formed in the vicinity of a converging point of the light flux R1, so that one spot in charge of the light flux R1 gets smaller, while the other spot in charge of the light flux R2 gets larger.

If the focal point of the laser beam emitted to the optical disc is on the front side of the signal recording surface (i.e. when a distance between the optical disc and the objective lens gets larger), then the spots that the light fluxes R1, R2 branched from the reflection light form on the light receiving elements 201, 202 are formed in the vicinity of a converging point of the other light flux R2, so that one spot in charge of the light flux R1 gets larger, while the other spot in charge of the light flux R2 gets smaller. If the spots formed by the light fluxes R1, R2 get smaller, then flux powers concentrate on the light receiving areas DET2, DET5 at respective centers of the light receiving elements 201, 202. Conversely, if the spots formed by the light fluxes R1, R2 get larger, then flux powers are diffused to the light receiving areas DET1, DET3, DET4 and DET6 on both sides of the light receiving elements 201, 202. That is, if representing respective output signals from the light receiving areas 201, 202 by signs "DET1", "DET2", "DET3", "DET4", "DET5" and "DET6" then the focus-error signal FES is obtained by the expression: FES=(DET1+DET3+DET5)−(DET2+DET4+DET6).

In the above-mentioned optical pickup devices for "CD" and "DVD", meanwhile, it is often the case that the astigmatism method is adopted in an optical pickup device (in bulk optical system) having its optical constitution in the form of non-integration. Additionally, in case of the astigmatism method, it is necessary to adjust the position of a quadrant photo detector with respect to the reflection light from an optical disc with high accuracy, causing both manufacturing and adjusting processes of the pickup device to be tangled.

Nevertheless, the astigmatism method would be advantageous if adopting so-called "push-pull method" or "DPD (differential phase detection) method" as a method for detecting a tracking-error signal, because the intensity of a reflection light from an optical disc is separated into four quadrants by both tangential and radial axes and represented in the form of four components in the astigmatism method. Thus, signal outputs from a quadrant photo detector in the astigmatism method could be utilized as they are in case of adopting either "push-pull method" or "DPD (differential phase detection) method".

On the other hand, it is often the case that the SSD method is adopted in an optical pickup device having an integrated optical system using a hologram element or the like. That is, in case of adopting the SSD method, different convex-lens powers (positive powers) are appended to two light fluxes (i.e. +first-order diffraction lights by the hologram element) and furthermore, each intensity of these (two) light fluxes is detected in the form of respective information from three divisional areas obtained by dividing one light receiving area by parting lines in parallel with the radial axis. Therefore, in the optical pickup device adopting the SSD method, there is no possibility that the detecting accuracy for the focus-error signal is influenced by either light spots' moving due to variations in diffraction angles at the hologram depending on wavelengths of the light fluxes element or optical system's assembling error in a direction of the radial axis. After all, the optical pickup device adopting the SSD method is capable of loosening its assembling accuracy in the direction of the radial axis.

Additionally, since two light fluxes used in the SSD method is symmetrical to each other about the tangential direction and further accompanied with different lens powers, it is also possible to loosen the assembling accuracy with respect to the tangential direction complementarily.

However, in case of adopting the SSD method, it is difficult to detect intensity components of the reflection light from an optical disc, which are divided by parting lines in an equivalent direction of the tangential axis and also required in both the DPD method and the push-pull method. Even if applying such a division to a hologram element, it is necessary to divide another element's area different from areas of tripartite division for the SSD method since there is no agreement in logic between the quadrant division (for DPD, push-pull) using both radial and tangential axes and the tripartite division for the SSD method.

Therefore, if adopting either the push-pull method or the DPD method in order to detect a tracking-error signal, then an optical path for detecting the tracking-error signal has to be separated from an optical path for detecting a focus-error signal as well as their respective output systems, causing the optical pickup device to be complicated in structure.

In this way, there are good and bad points in both the astigmatism method and the SSD method. In either case of adopting one method, an exclusive selection has been required by the sacrifice of advantages of the other method.

Still further, since there is a difference in an arithmetic logic of the focus-error signal between the astigmatism method and the SSD method, a FEP (Front End Processor) for generating a focus-error signal for the astigmatism method is incompatible with another FEP for the SSD method, requiring an exclusive FEP with respect to each method. Thus, for one read-write apparatus that has already come into existence as one unit for the astigmatism method, an optical pickup device in accordance with the SSD method could not have any interchangeable component. Further, a FEP addressing both of the methods would be complicated in structure.

SUMMARY OF THE INVENTION

Under a situation mentioned above, an object of the present invention is to provide an optical pickup device which is capable of loosening its assembling accuracy in the direction of the radial axis without being influenced by either light spots' moving due to variations in diffraction angles depending on wavelengths of the light fluxes element or optical system's assembling error in a direction of the radial axis, and further capable of loosening the assembling accuracy with respect to the tangential direction complementarily (i.e. an advantage by the SSD method). Another object of the present invention is to provide the optical pickup device which is capable of ensuring its compatibility with the detection of a focus-error signal by the astigmatism method in arithmetic logic, allowing a FEP (Front End Processor) for the astigmatism method to be used as a FEP for calculating the focus-error signal, and further capable of detecting a tracking-error signal with the use of intensity components obtained by dividing the intensity of a reflection light from an information recording medium into four quadrants by both tangential and radial axes (i.e. detection by "push-pull method", "2-element DPD method" and "4-element DPD method").

In order to achieve the above objects, according to a first aspect of the present invention, there is provided an optical pickup device that emits a convergent light to an information recording medium having information signals recorded along a recording track, detects a reflection light of the convergent light from the information recording medium and reads out the information signals, the optical pickup device comprising: a hologram element formed on a plane containing a transit area of the reflection light from the information recording medium; and a light receiving element for detecting the reflection light passing through the hologram element, wherein: the hologram element is divided into eight areas by a first parting line that coincides with a tangential axis extending parallel to a reflection optical axis of the reflection light in optical mapping, a second parting line that coincides with a radial axis running through the reflection optical axis and also intersecting with the recording track at right angles in optical mapping, a third parting line extending parallel to the second parting line and a fourth parting line extending parallel to the second parting line, the third parting line being symmetrical to the fourth parting lime about the second parting line; the eight areas of the hologram element are classified into first and second area groups both arranged on one side of the second parting line, each of the first and second area groups consisting of two areas opposing to each other in a diagonal direction about an intersection of the first parting line and either the third parting line or the fourth parting line, and third and fourth area groups both arranged on the other side of the second parting line, each of the third and fourth area groups consisting of two areas opposing to each other in a diagonal direction about an intersection of the first parting line and either the fourth parting line or the third parting line, each of the two areas in one area group partially constituting one group of curves producing one diffraction light having continuous wave surfaces; the first to the fourth area groups are formed so that a direction to divide O-order and ±first-order diffraction lights in each area group substantially coincides with an equivalent direction of the radial axis; the first to the fourth area groups are formed so as to produce two pairs of diffraction-light groups, one pair of diffraction-light group having its diffraction angles to the reflection optical axis different from respective diffraction angles of the other pair of diffraction-light group; the first to the fourth area groups are formed so as to add different lens powers with respect to an equivalent direction of the tangential axis to respective diffraction lights which are included in the same pair of diffraction-light group and whose diffraction angles to the reflection optical axis are equal to each other, thereby producing convergent lights of different convergent angles; the light receiving element is formed so as to contain at least respective transit areas of the two pairs of diffraction-light groups diffracted in substantially the same direction to the reflection optical axis by the first to the fourth area groups if the convergent light emitted to the information recording medium is in an in-focus state; the light receiving element is formed on a plane that is spaced from the hologram element in a direction of the reflection optical axis so as to allow the two pairs of diffraction-light groups to secede from each other spatially under condition that the convergent light emitted to the information recording medium is in the in-focus state; the plane is positioned between a focal line in the tangential direction of one diffraction light in the two pairs of diffraction-light groups and another focal line in the tangential direction of the other diffraction light in the two pairs of diffraction-light groups; the light receiving element is divided into four light receiving areas by a fifth parting line which is parallel to an equivalent direction of the tangential axis and is positioned at the substantial midpoint of the two pairs of diffraction-light groups and a sixth parting line which is parallel to an equivalent direction of the radial axis while passing through the reflection optical axis, the four light receiving areas producing four light-to-photocurrent converted outputs each proportional to any one of irradiation intensities of the diffraction lights; and the light receiving element is constructed such that if the convergent light emitted to the information recording medium is the in-focus state, then profile lines in the diffraction-light groups corresponding to the third parting line and the fourth parting line coincide with the second parting line of the light receiving element, whereby the four light receiving areas generate four light-to-photocurrent converted outputs corresponding to components of four quadrants obtained by dividing the reflection light from the information recording medium by the tangential axis and the radial axis.

Since the second parting line of the light receiving element is parallel to the radial axis in optical mapping, the above optical pickup device has a feature of "SSD method" optically. Additionally, the above optical pickup device is capable of detecting four components of four quadrants, which are obtained by dividing an intensity of the reflection light from the information recording medium by the tangential axis and the radial axis, independently without omission. Thus, the above optical pickup device can perform a detecting of a focus-error signal regarded as "astigmatism method" in arithmetic logic.

In order to achieve the above objects, according to a second aspect of the present invention, there is also provided an optical pickup device that emits a convergent light to an information recording medium having information signals recorded along a recording track, detects a reflection light of the convergent light from the information recording medium and reads out the information signals, the optical pickup device comprising: a hologram element formed on a plane containing a transit area of the reflection light from the information recording medium; and a light receiving element for detecting the reflection light passing through the hologram element, wherein: the hologram element is divided into eight areas by a first parting line that coincides with a tangential axis extending parallel to a reflection optical axis of the reflection light in optical mapping, a second parting line that coincides with a radial axis running through the reflection optical axis and also intersecting with the recording track at right angles in optical mapping, a third parting line extending parallel to the second parting line and a fourth parting line extending parallel to the second parting line, the third parting line being symmetrical to the fourth parting lime about the second parting line; the eight areas of the hologram element are classified into first and second area groups both arranged on one side of the second parting line, each of the first and second area groups consisting of two areas opposing to each other in a diagonal direction about an intersection of the first parting line and either the third parting line or the fourth parting line, and third and fourth area groups both arranged on the other side of the second parting line, each of the third and fourth area groups consisting of two areas opposing to each other in a diagonal direction about an intersection of the first parting line and either the fourth parting line or the third parting line, each of the two areas in one area group partially constituting one group of curves producing one diffraction light having continuous wave surfaces; the first to the fourth area groups are formed so that a direction to divide O-order and +first-order diffraction lights in each area group substantially coincides with an equivalent direction of the radial axis; the first to the fourth area groups are formed so as to produce two pairs of diffraction-light groups, one pair of diffraction-light group having its diffraction angles to the reflection optical axis different from respective diffraction angles of the other pair of diffraction-light group; the first to the fourth area groups are formed so as to add different lens powers with respect to each of an equivalent direction of the tangential axis and an equivalent direction of the radial axis to respective diffraction lights which are included in the same pair of diffraction-light group and whose diffraction angles to the reflection optical axis are equal to each other, thereby producing convergent lights of different convergent angles; the light receiving element is formed so as to contain at least respective transit areas of the two pairs of diffraction-light groups diffracted in substantially the same direction to the reflection optical axis by the first to the fourth area groups if the convergent light emitted to the information recording medium is in an in-focus state; the light receiving element is formed on a plane that is spaced from the hologram element in a direction of the reflection optical axis so as to allow the two pairs of diffraction-light groups to secede from each other spatially under condition that the convergent light emitted to the information recording medium is in the in-focus state; the plane is positioned between a focal line in the tangential direction of one diffraction light in the two pairs of diffraction-light groups and another focal line in the tangential direction of the other diffraction light in the two pairs of diffraction-light groups and between a focal line in the radial direction of one diffraction light in the two pairs of diffraction-light groups and another focal line in the radial direction of the other diffraction light in the two pairs of diffraction-light groups; the light receiving element is divided into four light receiving areas by a fifth parting line which is parallel to an equivalent direction of the tangential axis and is positioned at the substantial midpoint of the two pairs of diffraction-light groups and a sixth parting line which is parallel to an equivalent direction of the radial axis while passing through the reflection optical axis, the four light receiving areas producing four light-to-photocurrent converted outputs each proportional to any one of irradiation intensities of the diffraction lights; and the light receiving element is constructed such that if the convergent light emitted to the information recording medium is the in-focus state, then profile lines in the diffraction-light groups corresponding to the third parting line and the fourth parting line coincide with the second parting line of the light receiving element, whereby the four light receiving areas generate four light-to-photocurrent converted outputs corresponding to components of four quadrants obtained by dividing the reflection light from the information recording medium by the tangential axis and the radial axis.

Since the second parting line of the light receiving element is parallel to the radial axis in optical mapping, the above optical pickup device has a feature of "SSD method" optically. Additionally, the above optical pickup device is capable of detecting four components of four quadrants, which are obtained by dividing an intensity of the reflection light from the information recording medium by the tangential axis and the radial axis, independently without omission. Thus, the above optical pickup device can perform a detecting of a focus-error signal regarded as "astigmatism method" in arithmetic logic.

DETAILED DESCRIPTION OF THE PREFERRED EMBODIMENTS

Embodiments of the present invention will be described with reference to drawings.

1$^{st}$ Embodiment

Figure 1:
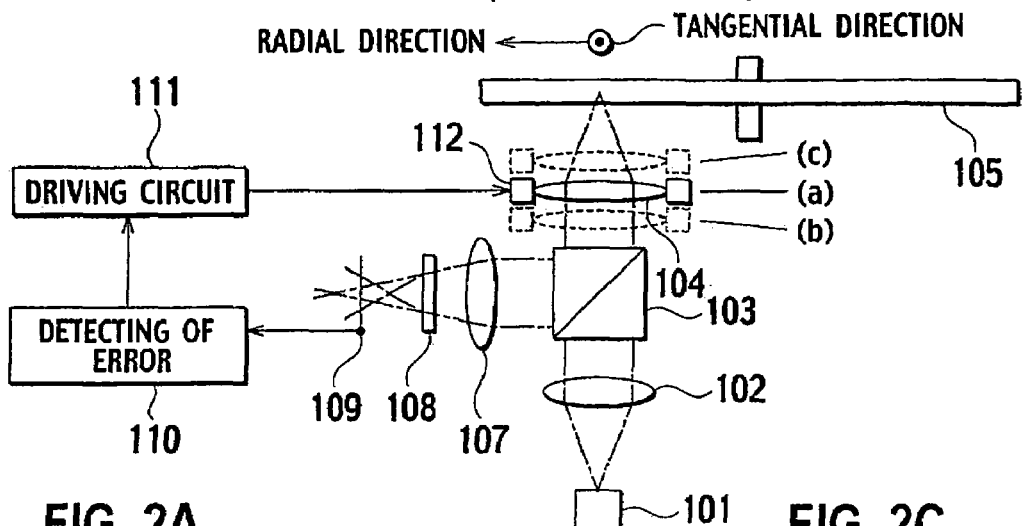
FIG. 1 is a side view showing a structure of an optical pickup device employing astigmatism method in related art.
Figures 2A, 2B, 2C:
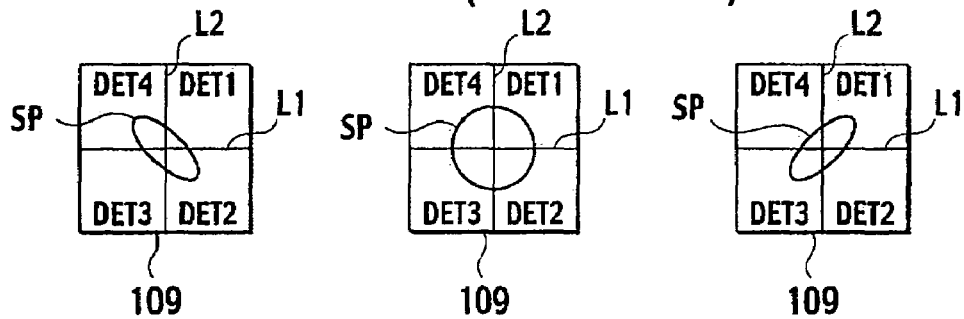
FIGS. 2A, 2B and 2C are front views each showing a structure of a quadrant optical detector in the optical pickup device employing the astigmatism method in related art.
Figure 3:
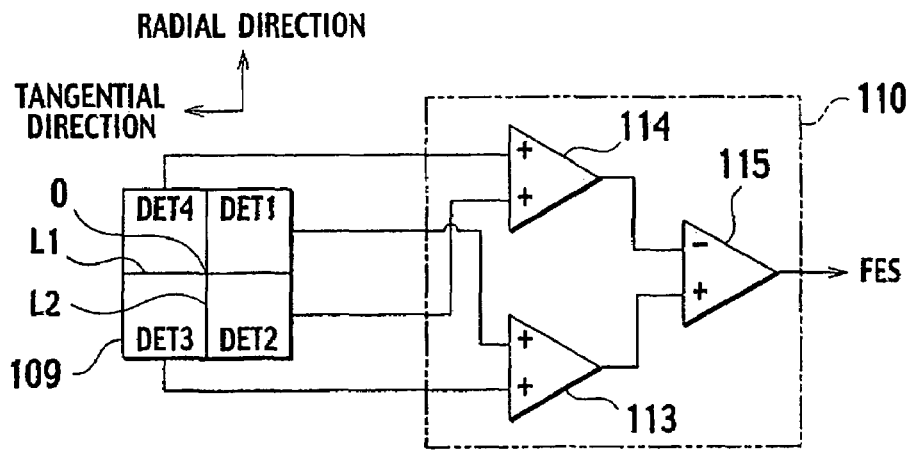
FIG. 3 is a block diagram showing a constitution of a focus-error signal detecting circuit in the optical pickup device employing the astigmatism method in related art.
Figure 4:
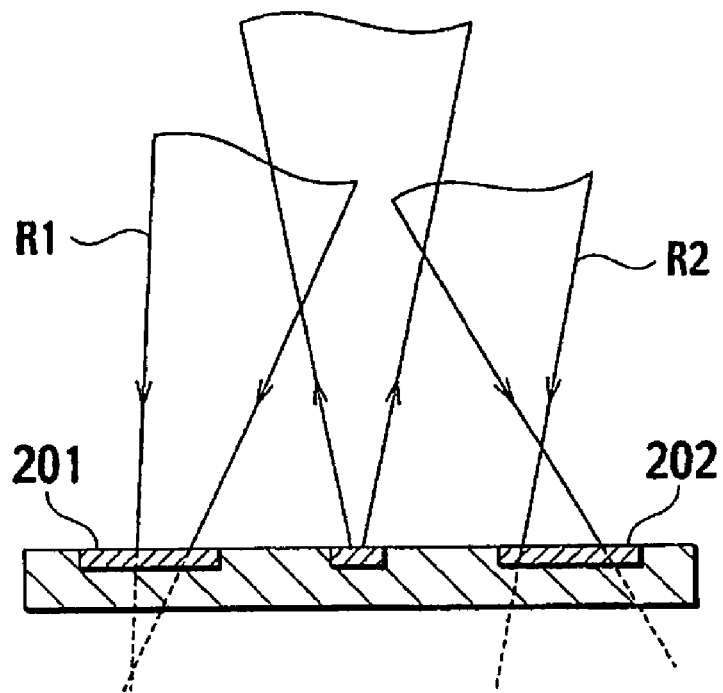
FIG. 4 is a side view showing a structure of a light receiving element in an optical pickup device employing SSD method in related art.
Figure 5:
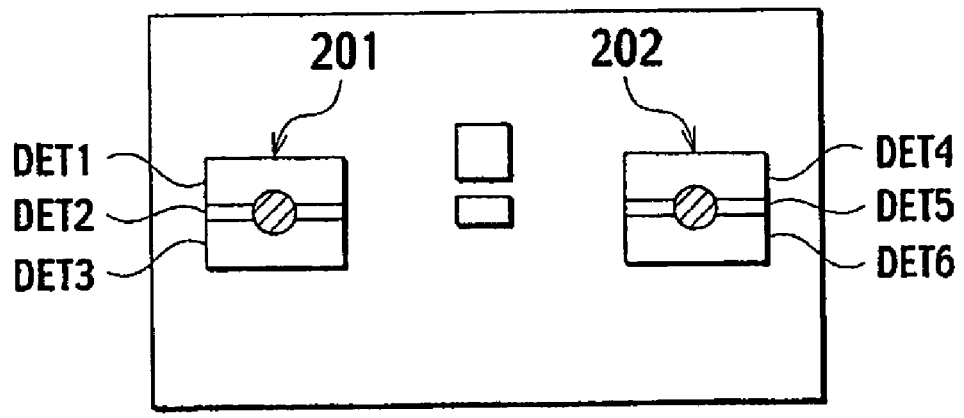
FIG. 5 is a plan view showing the structure of the light receiving element in the optical pickup device employing SSD method in related art.
Figure 6:
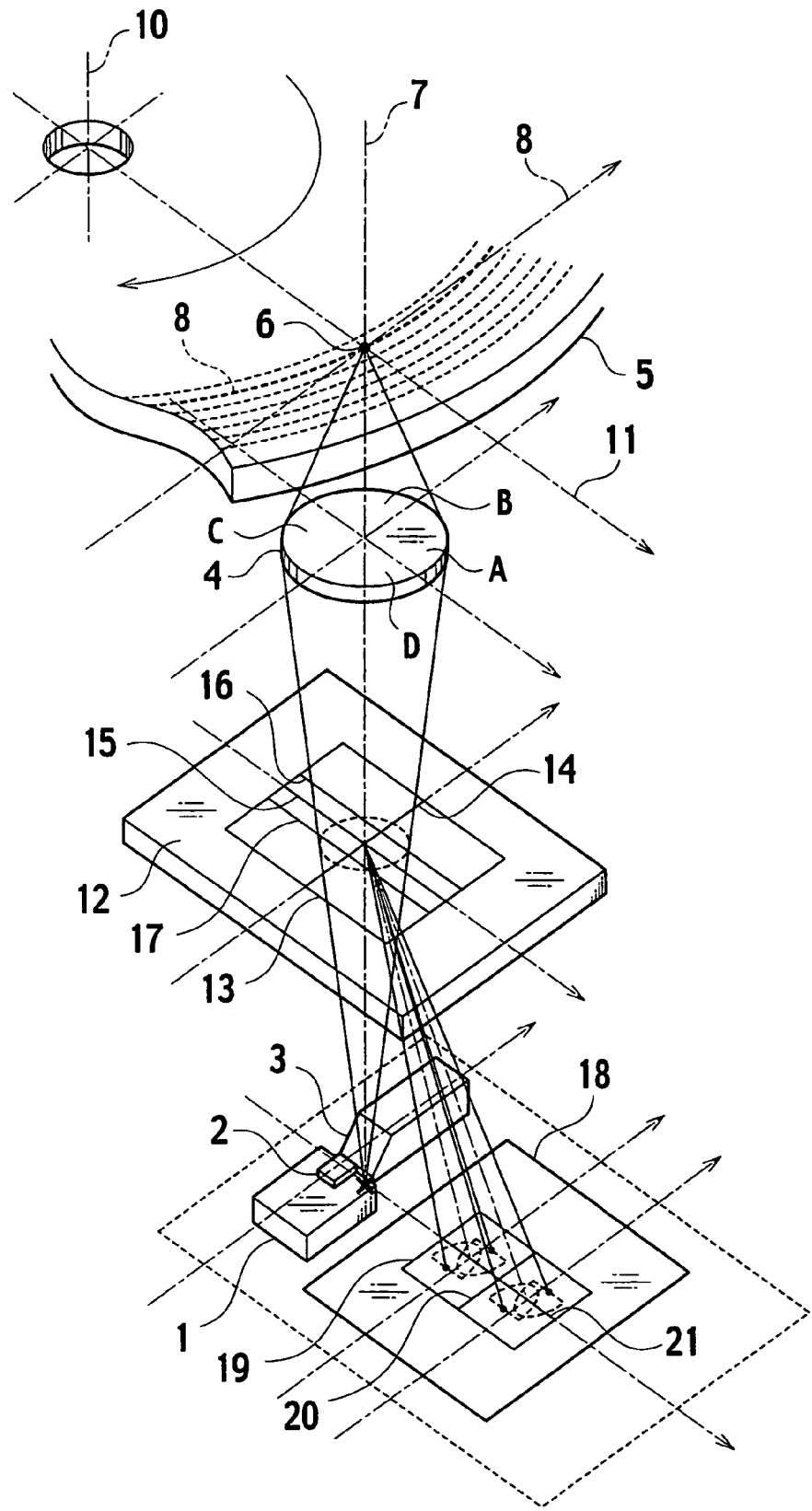
FIG. 6 is a perspective view showing a structure of an optical system of an optical pickup device of the present invention.

FIG. 6 is a perspective view showing a structure of an optical system of an optical pickup device of the present invention.

This pickup device is identical to a device that emits a convergence light to an optical disc as an information recoding medium having information signals recorded along a recoding track and reads out the information signals on detection of a reflection light of the convergence light from the optical disc.

In the optical pickup device, a light flux emitted from a laser element 2 mounted on a mount 1 is reflected on a mirror 3 forming one end surface of a prism and subsequently transmitted to an objective lens 4 through a hologram element 13. At the hologram element 13, this light flux (i.e. outward light) is unobnoxious to any effect.

The light flux entering the objective lens 4 becomes a convergence light converging on a signal recording surface of the optical disc 5, forming a light spot 6 on the same surface.

A reflection light produced as a result of reflecting on the signal recording surface (i.e. homeward light) returns to the objective lens 4 and subsequently enters the hologram element 13 through the objective lens 4. This hologram element 13 is built up on a plane containing an area where the reflection light from the optical disc 5 transits. The hologram element 13 is provided on a transparent substrate 12, in the form of a fine periodic structure.

Here, we refer to an axis in parallel with a tangential line of a recording track 8 on the optical disc 5 as a "tangential axis 9" and further refer to an axis crossing at right angles with the tangential axis 9 and passing through a rotating center 10 of the optical disc 5 as a "radial axis 11". An optical axis 7 for out and home light fluxes to/from the optical disc 5 is perpendicular to both of the tangential axis 9 and the radial axis 11.

The reflection light reflected by the optical disc 5 and entering the hologram element 13 is subjected to diffraction by the same element 13. As mentioned later, the hologram element 13 is divided into a plurality of zones (eight areas) by a plurality of parting lines 14, 15, 16, 17. The reflection light from the optical disc 5 is subjected, at respective divided areas of the hologram element 13, to different or identical diffraction. The reflection light upon the diffraction is diverged from zero-order light to first-order diffraction light at a predetermined angle with the optical axis 7, so that two pairs of diffraction light groups (four diffraction lights in total) are emitted from the hologram element 13. These two pairs of diffraction light groups enter a light receiving substrate 18.

A light receiving element 19 is formed on the light receiving substrate 18. The two pairs of diffraction-light groups via the hologram element 13 together enter the light receiving element 19 without leakage. Thus, the light receiving element 19 detects the reflection light transmitted through the hologram element 13.

As described later, the light receiving element 19 is divided into four light receiving areas by two parting lines 20, 21. With respect each light receiving area, the light receiving element 19 carries out light-to-photocurrent conversion corresponding to a light intensity of incident light flux and further outputs a signal. Thus, corresponding to four light receiving areas, the light receiving element 19 outputs four signals.

Note that the zero-order light of the reflection light from the optical disc 5 (at the hologram element 13) proceeds on the optical axis 7 without being subjected to diffraction and returns to the mirror 3 forming one end surface of the prism. The zero-order light enters the prism through the mirror 3. The zero-order light is received by a not-shown light receiving element arranged on the bottom side of the prism. A signal outputted from this light receiving element forms a read signal of the information recoded in the optical disc 5.

Figure 7:
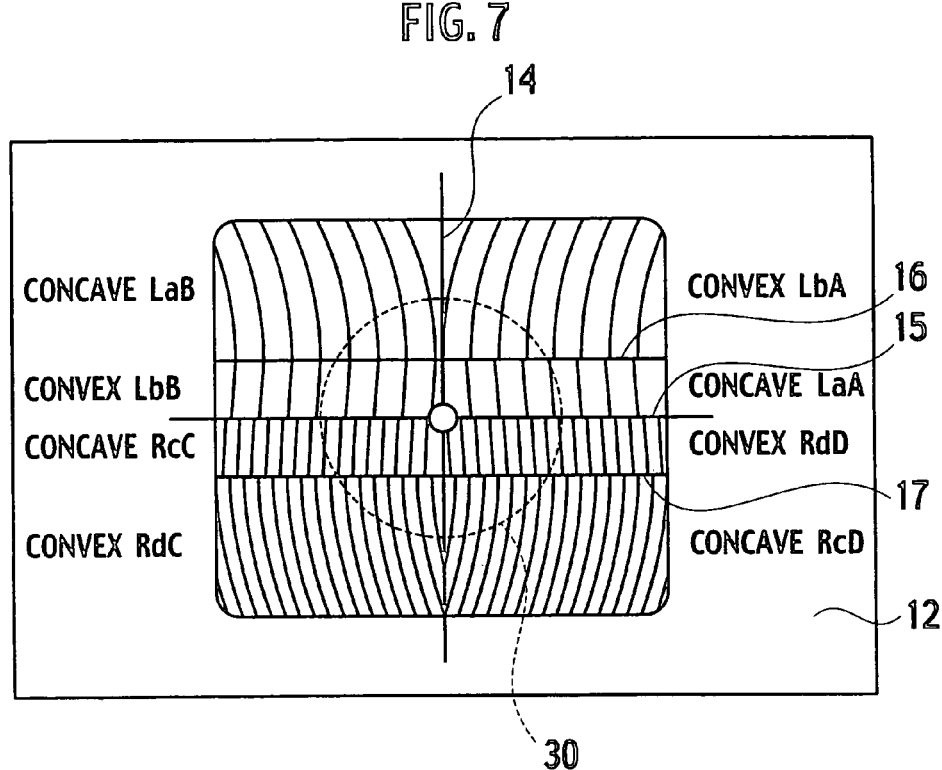
FIG. 7 is a plan view showing a structure of a hologram element of the pickup device, in accordance with a first embodiment of the present invention.

FIG. 7 is a plan view showing a structure of the hologram element.

As shown in FIG. 7, the hologram element 13 is divided into eight areas by a first parting line 14 that coincides with the tangential axis 9 in optical mapping, a second parting line 15 that coincides with the radial axis 11 in optical mapping, a third parting line 16 in parallel with the second parting line 15 and a fourth parting line 17 in parallel with the second parting line 15. Further, the third parting line 16 is symmetrical to the fourth parting lime 17 about the second parting line 15.

In the hologram element 13, these eight areas are formed by a first area group and a second area group on one side of the second parting line 15, each group consisting of two areas opposing to each other in a diagonal direction about an intersection of the first parting line 14 and the third parting line 16; and a third area group and a fourth area group on the other side of the second parting line 15, each group consisting of two areas opposing to each other in a diagonal direction about an intersection of the first parting line 14 and the fourth parting line 17.

Each of two areas included in one area group does partially constitute one group of curves producing one diffraction light having continuous wave front. In common with the first to the fourth area groups, the direction to diffract O-order and +first-order diffraction lights in each area group substantially coincides with an equivalent direction of the radial axis. In the first area group, additionally, its diffraction angle in an equivalent direction of the radial axis is substantially equal to a diffraction angle of the second area group in the equivalent direction of the radial axis. Similarly, a diffraction angle of the third area group in an equivalent direction of the radial axis is substantially equal to a diffraction angle of the fourth area group in the equivalent direction of the radial axis. Note that the diffraction angle of the first area group in the equivalent direction of the radial axis is different from the diffraction angle of the third area group in the equivalent direction of the radial axis.

Figure 8:
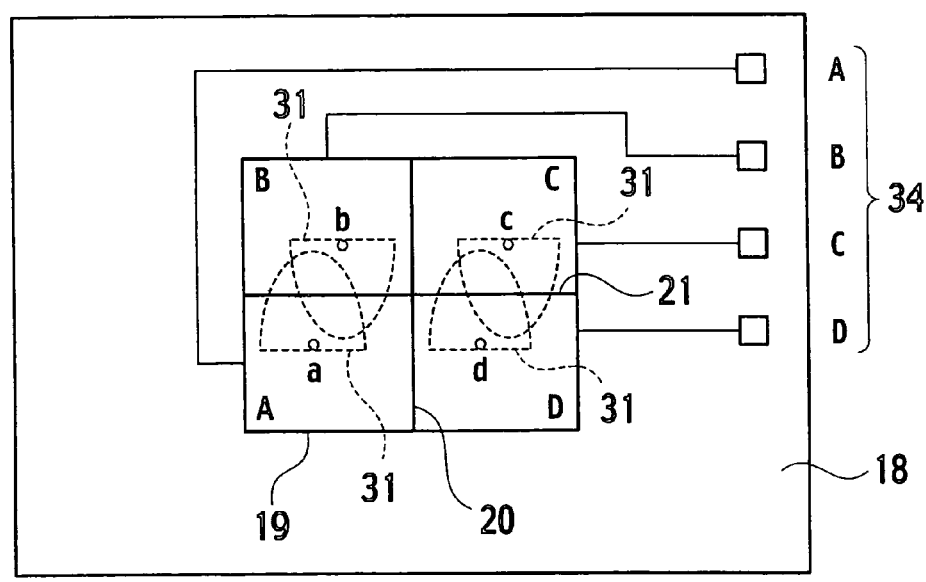
FIG. 8 is a plan view showing a structure of a light receiving element of the pickup device, in accordance with the first embodiment of the present invention.

That is, in FIG. 7, both parts indicated by signs "concave LaA" and "concave LaB" (i.e. the first area group) are formed by respective portions of the same group of curves and also adapted so as to provide the reflection light with a smaller diffraction angle with the object of irradiating the reflection light on an acceptance area on the left of the light receiving element 19 shown in FIG. 8. Additionally, in FIG. 7, both parts indicated by signs "convex LbA" and "convex LbB" (i.e. the second area group) are formed by respective portions of the same group of curves and also adapted so as to provide the reflection light with a smaller diffraction angle with the object of irradiating the reflection light on the acceptance area on the left of the light receiving element 19 shown in FIG. 8.

In FIG. 7, both parts indicated by signs "concave RcC" and "concave RcD" (i.e. the third area group) are formed by respective portions of the same group of curves and also adapted so as to provide the reflection light with a larger diffraction angle with the object of irradiating the reflection light on an acceptance area on the right of the light receiving element 19 shown in FIG. 8. Additionally, in FIG. 7, both parts indicated by signs "convex RdC" and "convex RdD" (i.e. the fourth area group) are formed by respective portions of the same group of curves and also adapted so as to provide the reflection light with a larger diffraction angle with the object of irradiating the reflection light on the acceptance area on the right of the light receiving element 19 shown in FIG. 8.

In common with these area groups, the diffracting direction is substantially identical to a direction of the radial axis. Further, these area groups are arranged so as to emit the diffraction lights to the light receiving element 19 that is an extension of the optical axis 7 along the direction of the radial axis. Additionally, by the first to the fourth area groups, there are produced two pairs of diffraction-light groups (a first diffraction-light group by the first and the second area groups; a second diffraction-light group by the third and the fourth area groups) whose diffraction angles to the optical axis of the reflection light (i.e. a reflection optical axis) are different from each other.

Note that an incident contour 30 of the reflection light (i.e. the homeward light) in the hologram element 13 is a part equivalent to an opening of the objective lens 4. Thus, it is preferable that an interval between the third parting line 16 and the fourth parting line 17 is set within the range of 40% to 60% of a diameter of the contour 30.

To respective diffraction lights forming the same diffraction-light group, whose diffraction angles to the reflection optical axis 7 are equal to each other, (e.g. one diffraction light and the other diffraction light in the first diffraction-light group; one diffraction light and the other diffraction light in the second diffraction-light group which), there are appended lens powers that are different from each other in an equivalent direction of the tangential axis, thereby producing convergent lights having different convergent angles from each other.

That is, in FIG. 7, respective parts (i.e. the first area group and the third area group) indicated by the signs "concave LaA", "concave LaB", "concave RcC" and "concave RcD" operate to add a lens power corresponding to a concave lens with respect to the tangential direction to the first-order diffraction light irradiating the light receiving element 19. As the reflection light entering each of the areas is a convergent light, it becomes a convergent light having a gentle angle owing to the addition of the lens power corresponding to a concave lens.

Again, in FIG. 7, respective parts (i.e. the second area group and the fourth area group) indicated by the signs "convex LbA", "convex LbB", "convex RdC" and "convex RdD" operate to add a lens power corresponding to a convex lens with respect to the tangential direction to the first-order diffraction light irradiating the light receiving element 19. As the reflection light entering each of the areas is a convergent light, it becomes a convergent light having a steep angle owing to the addition of the lens power corresponding to a convex lens.

The light receiving element 19 is formed as follows. First, as shown in FIG. 6, if the convergent light emitted to the optical disc 5 is in an in-focus state, then the light receiving element 19 contains respective transit areas of two pairs of diffraction-light groups, which have been diffracted in substantially the same direction (i.e. a substantial radial-axis direction) to the reflection optical axis 7 by the first to the fourth area groups. Secondly, the light receiving element 19 is formed on a plane that is spaced from the hologram element 13 in the direction of the optical axis so as to allow the two pairs of diffraction-light groups to secede from each other spatially under condition that the convergent light emitted to the optical disc 5 is in the in-focus state, That is, although two pairs of diffraction-light groups diffracted by the first to the fourth area groups of the hologram element 13 do form a substantially-integral contour at the point when they have been just emitted from the hologram element 13, they are gradually separated from each other due to a difference in diffraction angle between them. With the separation, when they reach a specific position at a predetermined distance from the hologram element 13 in the direction of the optical axis, two pairs of diffraction-light groups depart from each other in a direction of diffraction, that is, direction of the radial axis.

Additionally, this light receiving element 19 is formed in a plane between a focal line (in the tangential direction) of one diffraction light in two pairs of diffraction-light groups diffracted by the first to the fourth area groups of the hologram element 13 and another focal line (in the tangential direction) of the other diffraction light.

That is, as respective diffraction lights in two pairs of diffraction-light groups diffracted by the hologram element 13 are provided with different lens powers in the tangential direction, respective sizes of spots in the tangential direction become equal to each other at a substantially intermediate position between the focal lines. The light receiving element 19 is arranged in such a position.

FIG. 8 is a plan view of the light receiving element 19.

As shown in FIG. 8, the light receiving element 19 is divided into four light receiving areas by the first parting line 20 and the second parting line 21. The first parting line 20 is parallel to an equivalent direction of the tangential axis and is positioned at the substantial midpoint of the two pairs of diffraction-light groups. While, second parting line 21 is parallel to an equivalent direction of the radial axis while passing through the reflection optical axis 7. These four light receiving areas produce four light-to-photocurrent converted outputs each proportional to any one of irradiation intensities of the diffraction lights. These light-to-photocurrent converted outputs are read out through four signal output terminals corresponding to four light receiving areas respectively.

In the light receiving element 19, respective light spots whose shapes are equivalent to the shapes of respective areas in the hologram element 13 are formed in four contours 31 separated into two pairs, by two pairs of diffraction-light groups. Additionally, the light receiving element 19 is constructed such that if the convergent light irradiating the optical disc 5 is in the in-focus state, then profile lines (in the diffraction-light groups) corresponding to the third parting line 16 and the fourth parting line 17 coincide with the second parting line 21 of the light receiving element 19.

Suppose, alphabets A, B, C, and D represent four quadrant obtained by dividing the reflection light from the optical disc 5 by the tangential axis 9 and the radial axis 11, as shown in FIG. 6. In this case, resulting four components A, B, C and D correspond to light receiving areas on the light receiving element 19, which are represented by A, B, C and D in FIG. 8.

In this way, four light receiving areas of the light receiving element 19 generate four light-to-photocurrent converted outputs, each of which is proportional to any one of diffraction-light groups in two pairs, in the form of the light-to-photocurrent converted outputs A, B, C and D corresponding to the components of four quadrants as a result of dividing the reflection light by the tangential axis 9 and the radial axis 11.

Figure 9:
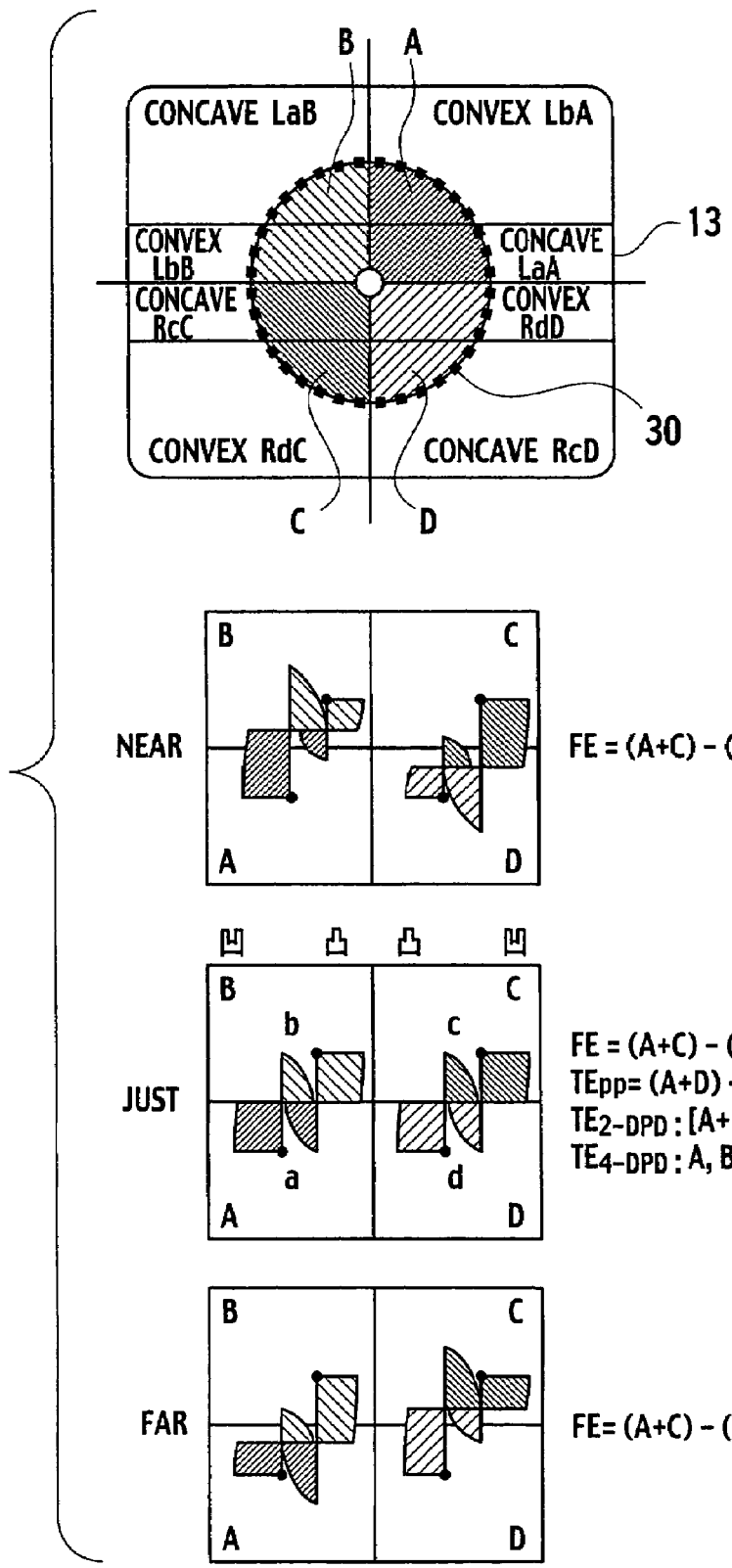
FIG. 9 is a plan view showing a detecting operation of a focus-error signal in the pickup device, in accordance with the first embodiment of the present invention.

FIG. 9 is a plan view showing an operation to detect a focus-error signal.

According to the pickup device of this embodiment, as shown in FIG. 9, the components in four quadrants (A, B, C and D) on the hologram element 13 are divided into two pairs of diffraction-light groups and received by the light receiving element 19. Using light-to-photocurrent converted outputs A, B, C and D, a focus-error signal FE is calculated by the expression: FE=(A+C)−(B+D).

When the optical disc 5 has a convergent light in the in-focus state (which is represented by "Just" in FIG. 9), respective light spots formed by two pairs of diffraction-light groups becomes equal to each other, so that the focus-error signal FE reaches zero (0). In this state, since the light-to-photocurrent converted outputs A, B, C and D correspond to the components of four quadrants (A, B, C and D) on the hologram element 13 respectively, a push-pull signal $TE_{pp}$, a 2-element DPD signal $TE_{2\text{-}dpd}$ and a 4-element DPD signal $TE_{4\text{-}dpd}$ can be obtained with the use of respective light-to-photocurrent converted outputs A, B, C and D by the following calculations:

$$TE_{pp}=(A+D)-(B+C);$$

$TE_{2\text{-}dpd}$: comparison in phase between [A+D] and [B+C]; and $TE_{4\text{-}dpd}$: comparison in phase
between [A+delayed−D] and [B+delayed−C].

When the convergent light is not in the in-focus state on the optical disc 5, in other words, the objective lens 4 is closer to the optical disc 5 (represented by "Near" in FIG. 9) or the objective lens 4 is farther from the optical disc 5 (represented by "Far" in FIG. 9), the focus-error signal FE does not become zero (0) as follows:

(Near) $FE=(A+C)-(B+D)<0$;

(Far) $FE=(A+C)-(B+D)>0$.

When the objective lens 4 is closer to the optical disc 5 (Near), the focus-error signal FE has a polarity opposite to the polarity of the focus-error signal FE under condition that the objective lens 4 is farther from the optical disc 5 (Far). That is, it will be understood that the focus-error signal FE of the embodiment functions as a focus-error signal fairly.

Figure 10:
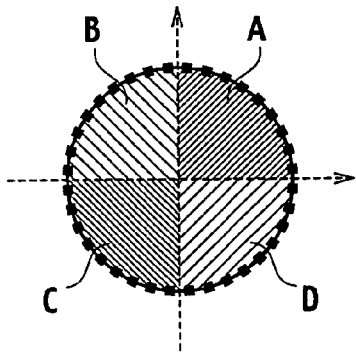
FIG. 10 is a plan view explaining compatibility between the detection of the focus-error signal in the pickup device and the astigmatism method.
Figure 10:
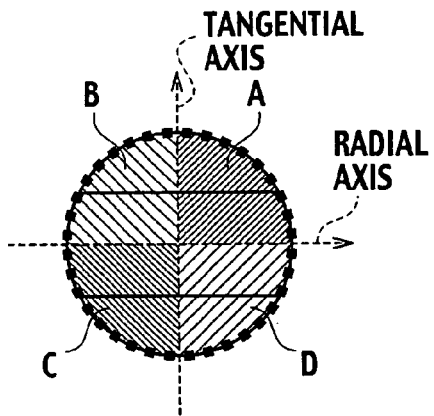
Figure 10:
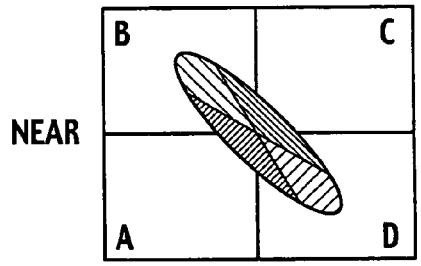
Figure 10:
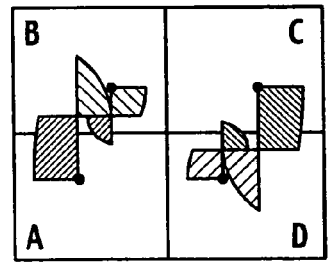
Figure 10:
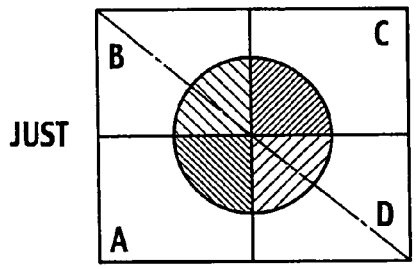
Figure 10:
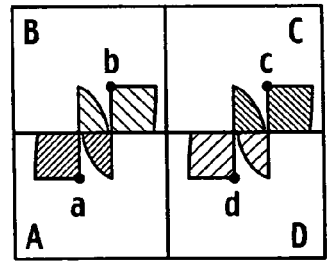
Figure 10:
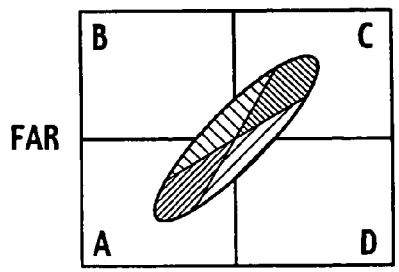
Figure 10:
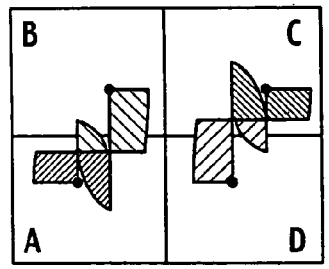

FIG. 10 is a plan view explaining compatibility between the detection of the focus-error signal in the pickup device and the astigmatism method.

Comparing the detection of a focus-error signal by the optical pickup device of the invention with the same by the astigmatism method in related art, it is found that the astigmatism method shown in a left column of FIG. 10 differs from the present invention shown in a right column of FIG. 10 in terms of the segmentation of a reflection light and the shape of a light receiving spot, while complete compatibility is maintained in terms of the output signals (light-to-photocurrent converted outputs A, B, C and D). This means that the optical pickup device of the invention is capable of calculating a focus-error signal with the use of the light-to-photocurrent converted outputs A, B, C and D and by the same calculating method as the astigmatism method in related art.

2$^{nd}$ Embodiment

The constitution of area groups in the hologram element 13 and the constitution of light receiving areas in the light receiving element 19 may be modified as follows.

Figure 11:
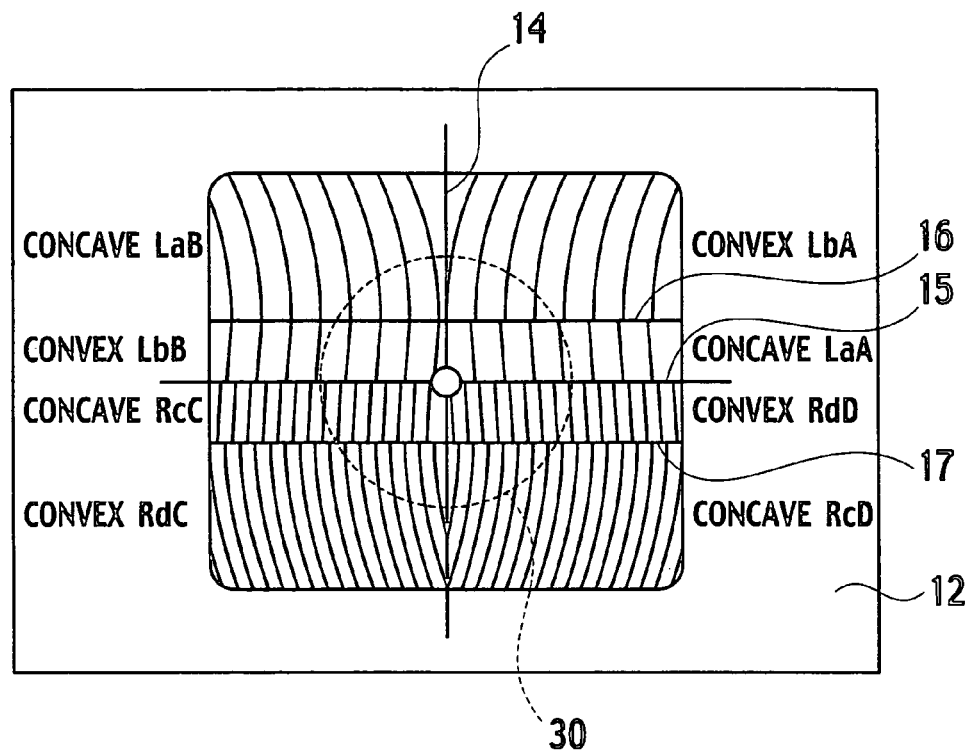
FIG. 11 is a plan view showing a structure of a hologram element of the pickup device, in accordance with a second embodiment of the present invention.

FIG. 11 is a plan view showing the constitution of a hologram element in accordance with the second embodiment of the present invention. Note, in the second embodiment, elements similar to those of the first embodiment are indicated with the same reference numerals, respectively.

According to the second embodiment, as shown in FIG. 11, the hologram element 13 is divided into eight areas by the first parting line 14 that coincides with the tangential axis 9 in optical mapping, the second parting line 15 that coincides with the radial axis 11 in optical mapping, the third parting line 16 in parallel with the second parting line 15 and the fourth parting line 17 in parallel with the second parting line 15. Further, the third parting line 16 is symmetrical to the fourth parting lime 17 about the second parting line 15.

In the hologram element 13, these eight areas are formed by a first area group and a second area group on one side of the second parting line 15, each group consisting of two areas opposing to each other in a diagonal direction about an intersection of the first parting line 14 and the third parting line 16; and a third area group and a fourth area group on the other side of the second parting line 15, each group consisting of two areas opposing to each other in a diagonal direction about an intersection of the first parting line 14 and the fourth parting line 17.

Each of both areas included in the same area group does constitute curves in the same group partially, which produce a diffraction light of the identical continuous wave surfaces. In common with the first to the fourth area groups, the direction to diffract O-order and ±first-order diffraction lights in each area group substantially coincides with an equivalent direction of the radial axis. In the first area group, additionally, its diffraction angle in an equivalent direction of the radial axis is substantially equal to a diffraction angle of the second area group in the equivalent direction of the radial axis. Similarly, a diffraction angle of the third area group in an equivalent direction of the radial axis is substantially equal to a diffraction angle of the fourth area group in the equivalent direction of the radial axis. Note that the diffraction angle of the first area group in the equivalent direction of the radial axis is different from the diffraction angle of the third area group in the equivalent direction of the radial axis.

Figure 12:
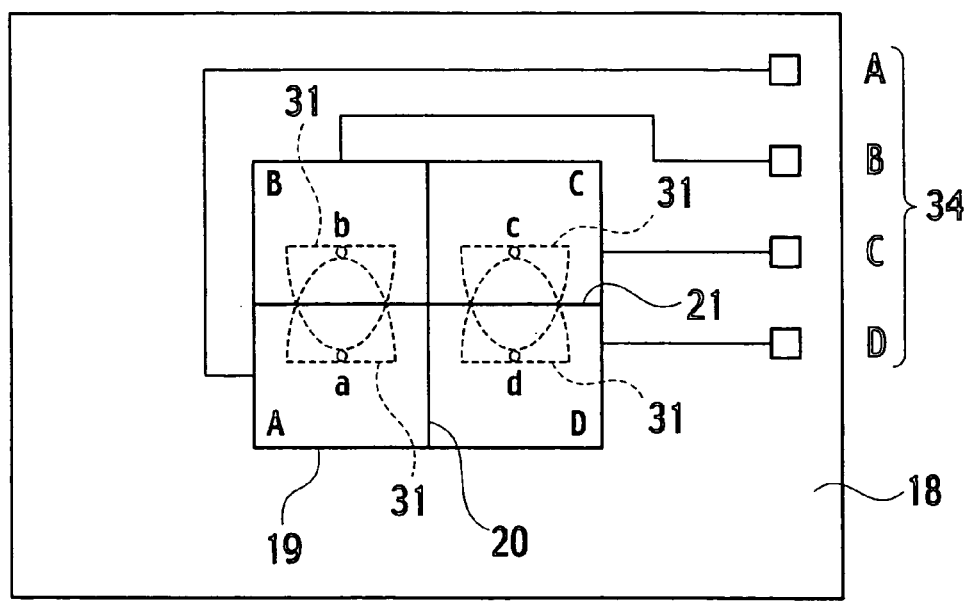
FIG. 12 is a plan view showing a structure of a light receiving element of the pickup device, in accordance with the second embodiment of the present invention.

That is, in FIG. 11, both parts indicated by signs "concave LaA" and "concave LaB" (i.e. the first area group) are formed by respective portions of the same group of curves and also adapted so as to provide the reflection light with a smaller diffraction angle with the object of irradiating the reflection light on an acceptance area on the left of the light receiving element 19 shown in FIG. 12. Additionally, in FIG. 11, both parts indicated by signs "convex LbA" and "convex LbB" (i.e. the second area group) are formed by respective portions of the same group of curves and also adapted so as to provide the reflection light with a smaller diffraction angle with the object of irradiating the reflection light on the acceptance area on the left of the light receiving element 19 shown in FIG. 12.

In FIG. 11, both parts indicated by signs "concave RcC" and "concave RcD" (i.e. the third area group) are formed by respective portions of the same group of curves and also adapted so as to provide the reflection light with a larger diffraction angle with the object of irradiating the reflection light on an acceptance area on the right of the light receiving element 19 shown in FIG. 12. Additionally, in FIG. 11, both parts indicated by signs "convex RdC" and "convex RdD" (i.e. the fourth area group) are formed by respective portions of the same group of curves and also adapted so as to provide the reflection light with a larger diffraction angle with the object of irradiating the reflection light on the acceptance area on the right of the light receiving element 19 shown in FIG. 12.

In common with these area groups, the diffracting direction is substantially identical to a direction of the radial axis. Further, these area groups are arranged so as to emit the diffraction lights to the light receiving element 19 that is an extension of the optical axis 7 along the direction of the radial axis. Additionally, by the first to the fourth area groups, there are produced two pairs of diffraction-light groups (a first diffraction-light group by the first and the second area groups; a second diffraction-light group by the third and the fourth area groups) whose diffraction angles to the optical axis of the reflection light (i.e. a reflection optical axis) are different from each other.

Note that an incident contour 30 of the reflection light (i.e. the homeward light) in the hologram element 13 is a part equivalent to an opening of the objective lens 4. Thus, it is preferable that an interval between the third parting line 16 and the fourth parting line 17 is set within the range of 40% to 60% of a diameter of the contour 30.

To respective diffraction lights forming the same diffraction-light group, whose diffraction angles to the reflection optical axis 7 are equal to each other, (e.g. one diffraction light and the other diffraction light in the first diffraction-light group; one diffraction light and the other diffraction light in the second diffraction-light group which), there are appended lens powers that are different from each other in both equivalent directions of the tangential axis and the radial axis, thereby producing convergent lights having different convergent angles from each other.

That is, in FIG. 11, respective parts (i.e. the first area group and the third area group) indicated by the signs "concave LaA", "concave LaB", "concave RcC" and "concave RcD" operate to add a lens power, which corresponds to a concave lens with respect to each of the equivalent direction of the tangential axis and the equivalent direction of the radial axis, to the first-order diffraction light irradiating the light receiving element 19. As the reflection light entering each of the areas is a convergent light, it becomes a convergent light having a gentle angle owing to the addition of the lens power corresponding to a concave lens.

Again, in FIG. 12, respective parts (i.e. the second area group and the fourth area group) indicated by the signs "convex LbA", "convex LbB", "convex RdC" and "convex RdD" operate to add a lens power, which corresponds to a convex lens with respect to each of the equivalent direction of the tangential axis and the equivalent direction of the radial axis, to the first-order diffraction light irradiating the light receiving element 19. As the reflection light entering each of the areas is a convergent light, it becomes a convergent light having a steep angle owing to the addition of the lens power corresponding to a convex lens.

The light receiving element 19 is formed as follows. First, as shown in FIG. 6, if the convergent light emitted to the optical disc 5 is in an in-focus state, then the light receiving element 19 contains respective transit areas of two pairs of diffraction-light groups, which have been diffracted in substantially the same direction (i.e. a substantial radial-axis direction) to the reflection optical axis 7 by the first to the fourth area groups. Secondly, the light receiving element 19 is formed on a plane that is spaced from the hologram element 13 in the direction of the optical axis so as to allow the two pairs of diffraction-light groups to secede from each other spatially under condition that the convergent light emitted to the optical disc 5 is in the in-focus state.

That is, although two pairs of diffraction-light groups diffracted by the first to the fourth area groups of the hologram element 13 do form a substantially-integral contour at the point when they have been just emitted from the hologram element 13, they are gradually separated from each other due to a difference in diffraction angle between them. With the separation, when they reach a specific position at a predetermined distance from the hologram element 13 in the direction of the optical axis, two pairs of diffraction-light groups depart from each other in a direction of diffraction, that is, direction of the radial axis.

Additionally, this light receiving element 19 is formed in a plane between a focal line (in the tangential direction) of one diffraction light in two pairs of diffraction-light groups diffracted by the first to the fourth area groups of the hologram element 13 and another focal line (in the tangential direction) of the other diffraction light and between a focal line (in the radial direction) of one diffraction light in two pairs of diffraction-light groups and another focal line (in the radial direction) of the other diffraction light.

That is, as respective diffraction lights in two pairs of diffraction-light groups diffracted by the hologram element 13 are provided with different lens powers in each of the tangential and radial directions, respective sizes of spots in both tangential and radial directions become equal to each other at a substantially intermediate position between the focal lines. The light receiving element 19 is arranged in such a position.

FIG. 12 is a plan view of the light receiving element 19.

As shown in FIG. 12, the light receiving element 19 is divided into four light receiving areas by the first parting line 20 and the second parting line 21. The first parting line 20 is parallel to a direction equivalent to the tangential axis and is positioned at the substantial midpoint of the two pairs of diffraction-light groups. While, second parting line 21 is parallel to a direction equivalent to the radial axis while passing through the reflection optical axis. These four light receiving areas produce four light-to-photocurrent converted outputs each proportional to any one of irradiation intensities of the diffraction lights. These light-to-photocurrent converted outputs are read out through four signal output terminals corresponding to four light receiving areas respectively.

In the light receiving element 19, respective light spots whose shapes are equivalent to the shapes of respective areas in the hologram element 13 are formed in four contours 31 separated into two pairs, by two pairs of diffraction-light groups. Additionally, the light receiving element 19 is constructed such that if the convergent light irradiating the optical disc 5 is in the in-focus state, then profile lines (in the diffraction-light groups) corresponding to the third parting line 16 and the fourth parting line 17 coincide with the second parting line 21 of the light receiving element 19.

Suppose, alphabets A, B, C, and D represent four quadrant obtained by dividing the reflection light from the optical disc 5 by the tangential axis 9 and the radial axis 11, as shown in FIG. 6. In this case, resulting four components A, B, C and D correspond to light receiving areas on the light receiving element 19, which are represented by A, B, C and D in FIG. 12.

In this way, four light receiving areas of the light receiving element 19 generate four light-to-photocurrent converted outputs, each of which is proportional to any one of diffraction-light groups in two pairs, in the form of the light-to-photocurrent converted outputs A, B, C and D corresponding to the components of four quadrants as a result of dividing the reflection light by the tangential axis 9 and the radial axis 11.

Figure 13:
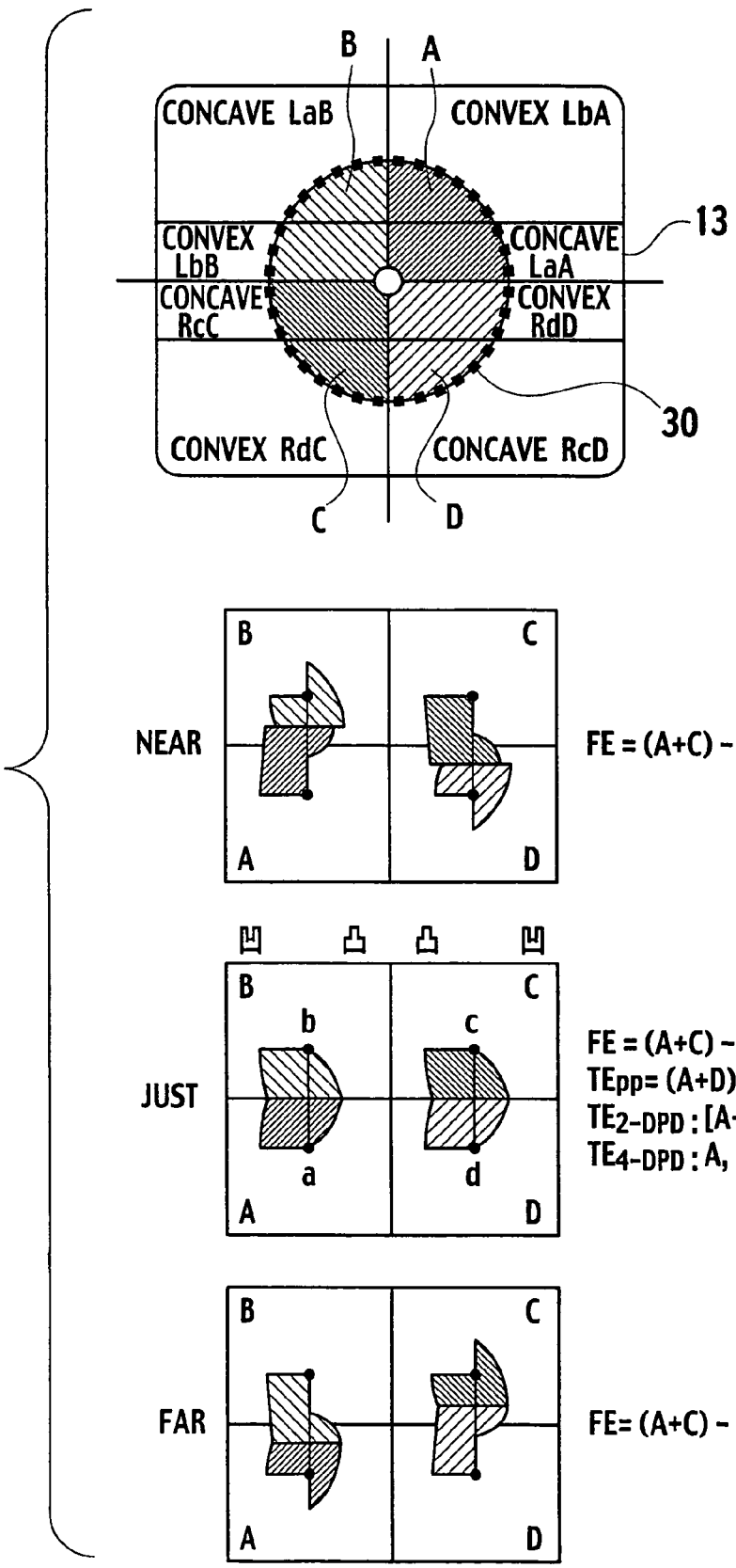
FIG. 13 is a plan view showing a detecting operation of a focus-error signal in the pickup device, in accordance with the second embodiment of the present invention.

FIG. 13 is a plan view showing an operation to detect a focus-error signal.

According to the pickup device of this embodiment, as shown in FIG. 13, the components in four quadrants (A, B, C and D) on the hologram element 13 are divided into two pairs of diffraction-light groups and received by the light receiving element 19. Using light-to-photocurrent converted outputs A, B, C and D, a focus-error signal FE is calculated by the expression: FE=(A+C)−(B+D).

When the optical disc 5 has a convergent light in the in-focus state (which is represented by "Just" in FIG. 13), respective light spots formed by two pairs of diffraction-light groups becomes equal to each other, so that the focus-error signal FE reaches zero (0). In this state, since the light-to-photocurrent converted outputs A, B, C and D correspond to the components of four quadrants (A, B, C and D) on the hologram element 13 respectively, a push-pull signal $TE_{pp}$, a 2-element DPD signal $TE_{2\text{-}dpd}$ and a 4-element DPD signal $TE_{4\text{-}dpd}$ can be obtained with the use of respective light-to-photocurrent converted outputs A, B, C and D by the following calculations:

$TE_{pp}=(A+D)-(B+C)$;

$TE_{2\text{-}dpd}$: comparison in phase between [A+D] and [B+C]; and $TE_{4\text{-}dpd}$: comparison in phase
between [A+delayed−D] and [B+delayed−C].

When the convergent light is not in the in-focus state on the optical disc 5, in other words, the objective lens 4 is closer to the optical disc 5 (represented by "Near" in FIG. 13) or the objective lens 4 is farther from the optical disc 5 (represented by "Far" in FIG. 13), the focus-error signal FE does not become zero (0) as follows:

(Near) $FE=(A+C)-(B+D)<0$;

(Far) $FE=(A+C)-(B+D)>0$.

When the objective lens 4 is closer to the optical disc 5 (Near), the focus-error signal FE has a polarity opposite to the polarity of the focus-error signal FE under condition that the objective lens 4 is farther from the optical disc 5 (Far). That is, it will be understood that the focus-error signal FE of the embodiment functions as a focus-error signal fairly.

Also in the optical pickup device of the second embodiment, its complete compatibility with the astigmatism method in related art is maintained in terms of the output signals (light-to-photocurrent converted outputs A, B, C and D). This means that the optical pickup device of the second embodiment is capable of calculating a focus-error signal with the use of the light-to-photocurrent converted outputs A, B, C and D and by the same calculating method as the astigmatism method in related art.

In common with the above-mentioned embodiments, the present invention is applicable to a reading and/or writing optical pickup device dealing with optical discs in accordance with various standards, for example, standards for CD, standards for DVD, "HD-DVD", "BD", etc.

According to the present invention, since the second parting line of the light receiving element is parallel to the radial axis in optical mapping, the above optical pickup device has a feature of "SSD method" optically. Additionally, the above optical pickup device is capable of detecting four components of four quadrants, which are obtained by dividing an intensity of the reflection light from the information recording medium by the tangential axis and the radial axis, independently without omission. Thus, the above optical pickup device can perform a detecting of a focus-error signal regarded as "astigmatism method" in arithmetic logic.

In the optical pickup device of the present invention, it is possible to loosen its assembling accuracy in the direction of the radial axis without being influenced by either light spots' moving due to variations in diffraction angles depending on wavelengths of the light fluxes element or optical system's assembling error in a direction of the radial axis. Additionally, it is also possible to loosen the assembling accuracy with respect to the tangential direction complementarily (i.e. an advantage by the SSD method). Further, it is possible to ensure its compatibility with the detection of a focus-error signal by the astigmatism method in arithmetic logic, allowing a FEP (Front End Processor) for the astigmatism method to be used as a FEP for calculating the focus-error signal.

Thus, the optical pickup device allows its connection with the conventionally-used FEP (Front End Processor) for the astigmatism method as it is while maintaining latitude in assembling accuracy in the "SSD method". Further, the optical pickup device is compatible with one component for a read-write apparatus that has been already produced as one completed product for the astigmatism method.

In the optical pickup device of the present invention, additionally, it is possible to accomplish a detecting of a tracking-error signal using intensity components (i.e. detection by "push-pull method", "2-element DPD method" and "4-element DPD method"), which are obtained by dividing the intensity of a reflection light from an information recording medium into four quadrants by both tangential and radial axes, without complicating its structure.

Finally, it will be understood by those skilled in the art that the foregoing descriptions are nothing but embodiments and various modifications of the disclosed optical pickup device and therefore, various changes and modifications may be made within the scope of claims.

What is claimed is:

1. An optical pickup device that emits a convergent light to an information recording medium having information signals recorded along a recording track, detects a reflection light of the convergent light from the information recording medium and reads out the information signals, the optical pickup device comprising:

a hologram element formed on a plane containing a transit area of the reflection light from the information recording medium; and a light receiving element for detecting the reflection light passing through the hologram element, wherein:

the hologram element is divided into eight areas by a first parting line that coincides with a tangential axis extending parallel to a reflection optical axis of the reflection light in optical mapping, a second parting line that coincides with a radial axis running through the reflection optical axis and also intersecting with the recording track at right angles in optical mapping, a third parting line extending parallel to the second parting line and a fourth parting line extending parallel to the second parting line, the third parting line being symmetrical to the fourth parting line about the second parting line;

the eight areas of the hologram element are classified into first and second area groups both arranged on one side of the second parting line, each of the first and second area groups consisting of two areas opposing to each other in a diagonal direction about an intersection of the first parting line and either the third parting line or the fourth parting line, and third and fourth area groups both arranged on the other side of the second parting line, each of the third and fourth area groups consisting of two areas opposing to each other in a diagonal direction about an intersection of the first parting line and either the fourth parting line or the third parting line, each of the two areas in one area group partially constituting one group of curves producing one diffraction light having continuous wave surfaces;

the first to the fourth area groups are formed so that a direction to divide 0-order and ±first-order diffraction lights in each area group substantially coincides with an equivalent direction of the radial axis; the first to the fourth area groups are formed so as to produce two pairs of diffraction-light groups, one pair of diffraction-light group having its diffraction angles to the reflection optical axis different from respective diffraction angles of the other pair of diffraction-light group;

the first to the fourth area groups are formed so as to add different lens powers with respect to an equivalent direction of the tangential axis to respective diffraction lights which are included in the same pair of diffraction-light group and whose diffraction angles to the reflection optical axis are equal to each other, thereby producing convergent lights of different convergent angles;

the light receiving element is formed so as to contain at least respective transit areas of the two pairs of diffraction-light groups diffracted in substantially the same direction to the reflection optical axis by the first to the fourth area groups if the convergent light emitted to the information recording medium is in an in-focus state;

the light receiving element is formed on a plane that is spaced from the hologram element in a direction of the reflection optical axis so as to allow the two pairs of diffraction-light groups to secede from each other spatially under a condition that the convergent light emitted to the information recording medium is in the in-focus state;

the plane is positioned between a focal line in the tangential direction of one diffraction light in the two pairs of diffraction-light groups and another focal line in the tangential direction of the other diffraction light in the two pairs of diffraction-light groups;

the light receiving element is divided into four light receiving areas by a fifth parting line which is parallel to an equivalent direction of the tangential axis and is positioned at the substantial midpoint of the two pairs of diffraction-light groups and a sixth parting line which is parallel to an equivalent direction of the radial axis while passing through the reflection optical axis, the four light receiving areas producing four light-to-photocurrent converted outputs each proportional to any one of irradiation intensities of the diffraction lights;

and the light receiving element is constructed such that if the convergent light emitted to the information recording medium is in the in-focus state, then profile lines in the diffraction-light groups corresponding to the third parting line and the fourth parting line coincide with the second parting line of the light receiving element, whereby the four light receiving areas generate four light-to-photocurrent converted outputs corresponding to components of four quadrants obtained by dividing the reflection light from the information recording medium by the tangential axis and the radial axis.

2. An optical pickup device that emits a convergent light to an information recording medium having information signals recorded along a recording track, detects a reflection light of the convergent light from the information recording medium and reads out the information signals, the optical pickup device comprising:

a hologram element formed on a plane containing a transit area of the reflection light from the information recording medium;

and a light receiving element for detecting the reflection light passing through the hologram element, wherein:

the hologram element is divided into eight areas by a first parting line that coincides with a tangential axis extending parallel to a reflection optical axis of the reflection light in optical mapping, a second parting line that coincides with a radial axis running through the reflection optical axis and also intersecting with the recording track at right angles in optical mapping, a third parting line extending parallel to the second parting line and a fourth parting line extending parallel to the second parting line, the third parting line being symmetrical to the fourth parting line about the second parting line;

the eight areas of the hologram element are classified into first and second area groups both arranged on one side of the second parting line, each of the first and second area groups consisting of two areas opposing to each other in a diagonal direction about an intersection of the first parting line and either the third parting line or the fourth parting line, and third and fourth area groups both arranged on the other side of the second parting line, each of the third and fourth area groups consisting of two areas opposing to each other in a diagonal direction about an intersection of the first parting line and either the fourth parting line or the third parting line, each of the two areas in one area group partially constituting one group of curves producing one diffraction light having continuous wave surfaces;

the first to the fourth area groups are formed so that a direction to divide 0-order and ±first-order diffraction lights in each area group substantially coincides with an equivalent direction of the radial axis;

the first to the fourth area groups are formed so as to produce two pairs of diffraction-light groups, one pair of diffraction-light group having its diffraction angles to the reflection optical axis different from respective diffraction angles of the other pair of diffraction-light group;

the first to the fourth area groups are formed so as to add different lens powers with respect to each of an equivalent direction of the tangential axis and an equivalent direction of the radial axis to respective diffraction lights which are included in the same pair of diffraction-light group and whose diffraction angles to the reflection optical axis are equal to each other, thereby producing convergent lights of different convergent angles;

the light receiving element is formed so as to contain at least respective transit areas of the two pairs of diffraction-light groups diffracted in substantially the same direction to the reflection optical axis by the first to the fourth area groups if the convergent light emitted to the information recording medium is in an in-focus state;

the light receiving element is formed on a plane that is spaced from the hologram element in a direction of the reflection optical axis so as to allow the two pairs of diffraction-light groups to secede from each other spatially under a condition that the convergent light emitted to the information recording medium is in the in-focus state;

the plane is positioned between a focal line in the tangential direction of one diffraction light in the two pairs of diffraction-light groups and another focal line in the tangential direction of the other diffraction light in the two pairs of diffraction-light groups and between a focal line in the radial direction of one diffraction light in the two pairs of diffraction-light groups and another focal line in the radial direction of the other diffraction light in the two pairs of diffraction-light groups;

the light receiving element is divided into four light receiving areas by a fifth parting line which is parallel to an equivalent direction of the tangential axis and is positioned at the substantial midpoint of the two pairs of diffraction-light groups and a sixth parting line which is parallel to an equivalent direction of the radial axis while passing through the reflection optical axis, the four light receiving areas producing four light-to-photocurrent converted outputs each proportional to any one of irradiation intensities of the diffraction lights;

and the light receiving element is constructed such that if the convergent light emitted to the information recording medium is in the in-focus state, then profile lines in the diffraction-light groups corresponding to the third parting line and the fourth parting line coincide with the second parting line of the light receiving element, whereby the four light receiving areas generate four light-to-photocurrent converted outputs corresponding to components of four quadrants obtained by dividing the reflection light from the information recording medium by the tangential axis and the radial axis.

* * * * *